United States Patent
Unger et al.

(10) Patent No.: US 8,630,186 B2
(45) Date of Patent: Jan. 14, 2014

(54) SYSTEMS AND METHODS FOR TRANSMISSION OF TRIGGER-BASED ALARM INDICATION SUPPRESSION MESSAGES

(75) Inventors: Stephen John Unger, Allen, TX (US); David Joseph Haas, Mahwah, NJ (US); Jian-Lin Mu, Ramsey, NJ (US); Virgil Vladescu, Hillsdale, NJ (US); Nimer Yaseen, Allen, TX (US); Basavaraj Menasinahal, Montvale, NJ (US); Calvin Wan, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 860 days.

(21) Appl. No.: 12/781,096

(22) Filed: May 17, 2010

(65) Prior Publication Data

US 2011/0279258 A1    Nov. 17, 2011

(51) Int. Cl.
*H04J 1/16* (2006.01)
*H04L 12/28* (2006.01)

(52) U.S. Cl.
USPC ........... 370/241; 370/252; 370/216; 370/278; 370/419

(58) Field of Classification Search
USPC .......................... 370/252, 278, 216, 241, 419
See application file for complete search history.

(56) References Cited

U.S. PATENT DOCUMENTS

| | | | |
|---|---|---|---|
| 2002/0176131 A1* | 11/2002 | Walters et al. | 359/118 |
| 2006/0031482 A1* | 2/2006 | Mohan et al. | 709/224 |
| 2011/0116363 A1* | 5/2011 | Elie-Dit-Cosaque et al. | 370/216 |

* cited by examiner

Primary Examiner — John Pezzlo
(74) Attorney, Agent, or Firm — Baker Botts L.L.P.

(57) ABSTRACT

According to one embodiment, a method may include communicating an alarm suppression indication trigger message from a maintenance end point to an alarm indication suppression generator. The method may further include communicating, by the alarm indication suppression generator in response to receiving the alarm indication trigger message, an alarm indication suppression message to at least one flow point that has alarm indication suppression enabled for the maintenance end point such that the alarm indication suppression message is received by at least one other maintenance end point upstream of the maintenance end point.

8 Claims, 2 Drawing Sheets

SYSTEMS AND METHODS FOR TRANSMISSION OF TRIGGER-BASED ALARM INDICATION SUPPRESSION MESSAGES

TECHNICAL FIELD

This invention relates generally to the field of communications systems and more specifically to transmission of alarm indication suppression messages.

BACKGROUND

A communication network may include network elements that route packets through the network. Some network elements may include a distributed architecture, wherein packet processing may be distributed among several subsystems of the network element (e.g., line cards).

Service Operation, Administration, and Management ("Service OAM" or "SOAM"), is defined by IEEE 802.1ag and defines Maintenance Entity Group End Points (MEPs) that reside on a line card. MEPs may include service-aware MEPs (e.g., MEPs attached to a service point or flow point) and service-transparent MEPs (e.g., MEPs that are not placed on a service flow point, but rather at a service aggregation point, such as an interface level). The ITU Y.1731 standard complements IEEE 802.1ag by allowing a MEP to transmit a Ethernet Alarm Indication Suppression (Eth-AIS) messages in a network direction away from where it's peer MEP is located (e.g., in an upstream direction opposite to the direction in which the MEP communicates CCM messages). Such Eth-AIS messages allow for alarms to be suppressed when received by a MEP. In a distributed architecture, certain services, such as Enhanced Internal Sublayer Service (EISS) and Internal Sublayer Service (ISS) defined by IEEE 802.3 for ingress and egress interfaces of a network element may reside on different line cards.

One disadvantage of the traditional transmission of Eth-AIS messages in such architectures is that Eth-AIS messages must traverse the entire switch fabric of the network element in the case of a down (e.g., failed or non-operational) MEP. Such approach leads to inefficient use of the switch fabric, and scalability is defined on a single ingress line card that is generating the Eth-AIS messages, and there may be more services to which Eth-AIS messages are to be distributed than can be supported.

SUMMARY OF THE DISCLOSURE

In accordance with the present invention, disadvantages and problems associated with communication of alarm indication suppression messages may be reduced or eliminated.

According to one embodiment, a method may include communicating an alarm suppression indication trigger message from a maintenance end point to an alarm indication suppression generator. The method may further include communicating, by the alarm indication suppression generator in response to receiving the alarm indication trigger message, an alarm indication suppression message to at least one flow point that has alarm indication suppression enabled for the maintenance end point such that the alarm indication suppression message is received by at least one other maintenance end point upstream of the maintenance end point.

Certain embodiments of the invention may provide one or more technical advantages. A technical advantage of one embodiment may be that alarm indication signals may be send to multiple upstream client maintenance end points (e.g., MEPs) where the number of alarm indication signals would otherwise exceed the bandwidth of a maintenance end point originating the alarm suppression messages.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which.

DETAILED DESCRIPTION OF THE DRAWINGS

Figure 1:
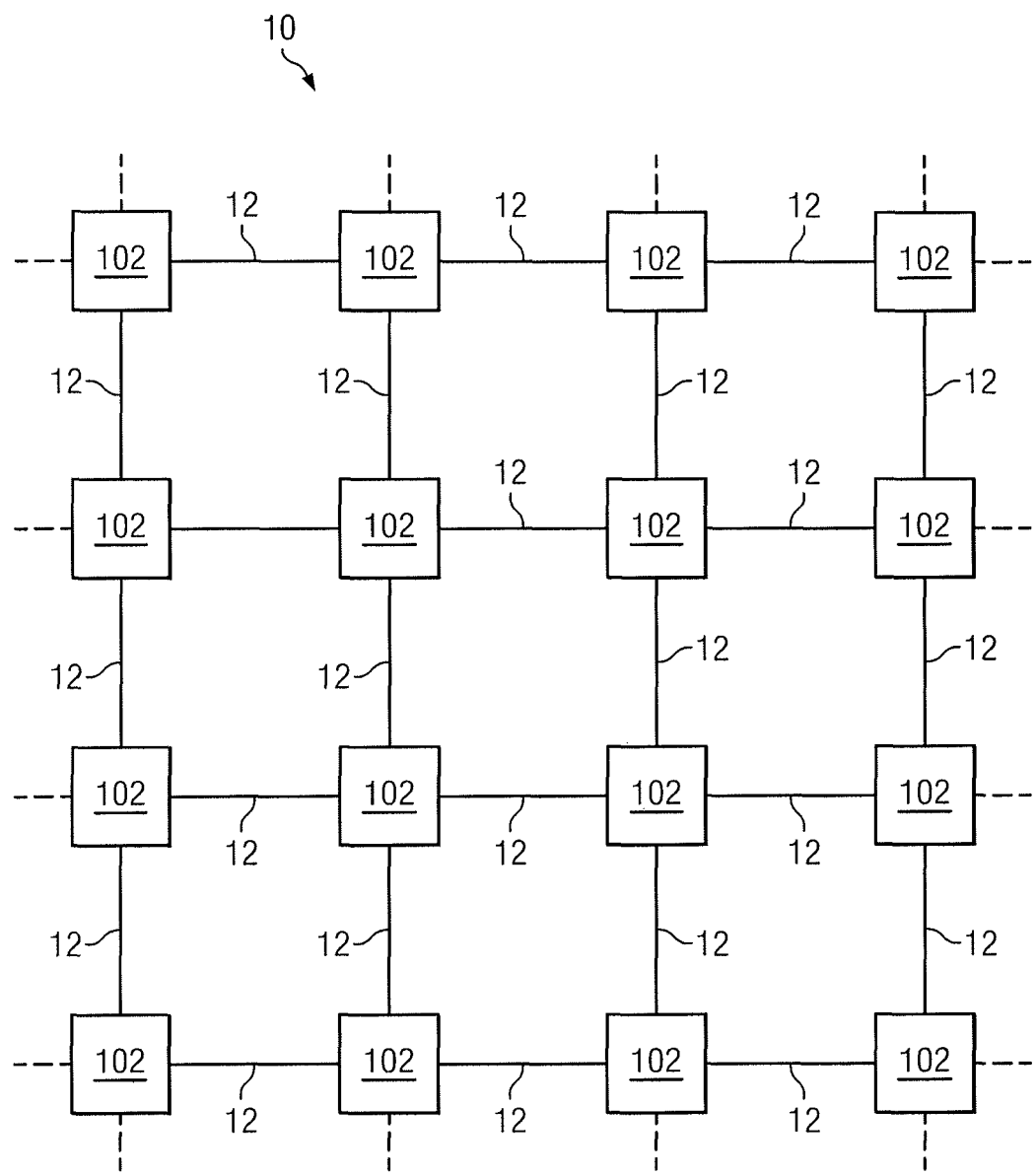
FIG. 1 illustrates a block diagram of an example network, in accordance with certain embodiments of the present disclosure.
Figure 2:
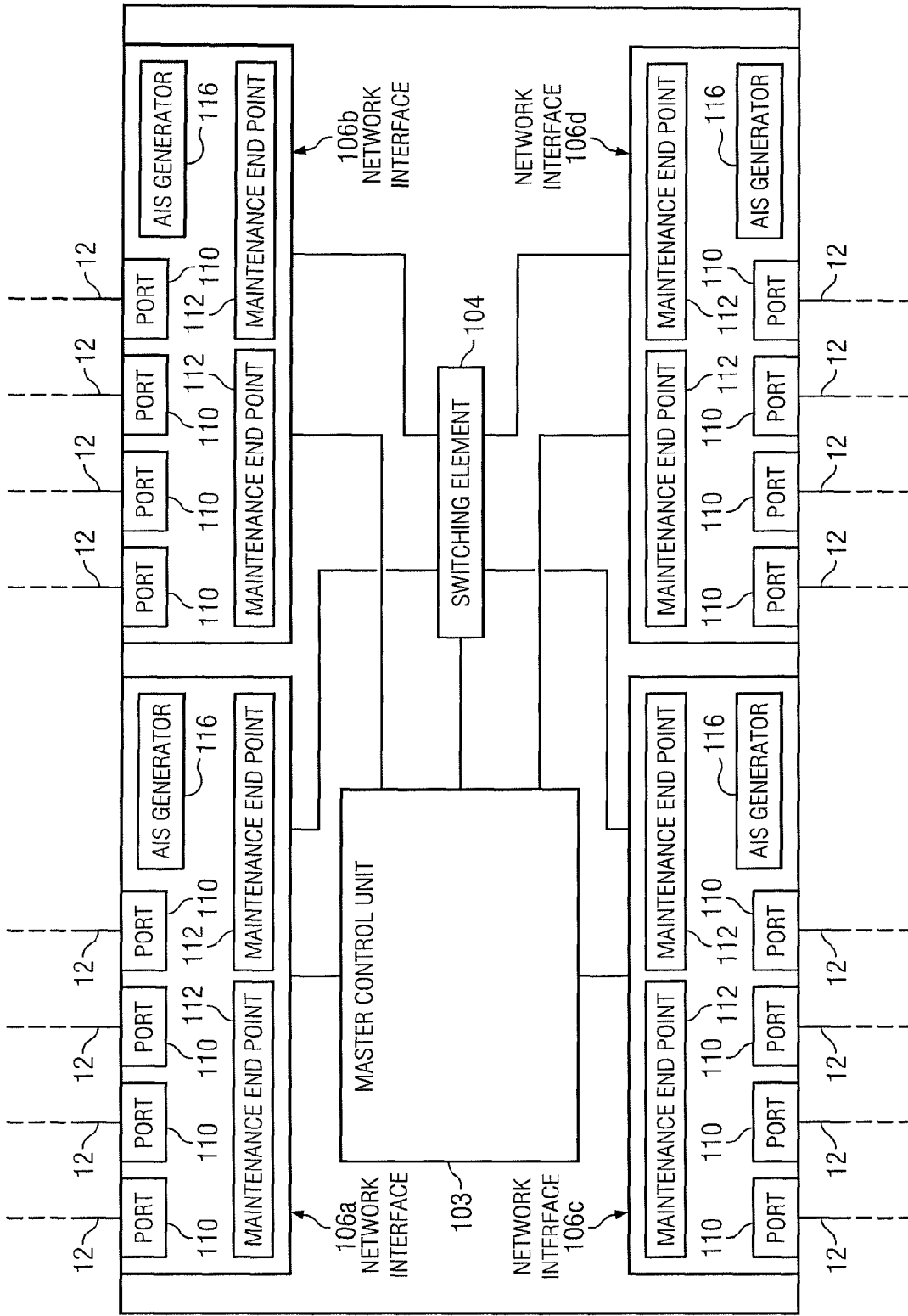
FIG. 2 illustrates a block diagram an example network element, in accordance with certain embodiments of the present disclosure.

Embodiments of the present invention and its advantages are best understood by referring to FIGS. 1-2, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. Master control unit 103 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 to a corresponding egress port 110.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 (e.g., a network interface 106*a*-106*d*) may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

Also as shown in FIG. 2, each network interface 106 may have one or more maintenance end points 112 provisioned thereon. A maintenance end point 112 may include an end point of a group of network components associated with a particular maintenance level and may be configured to communicate management traffic, such as heartbeat or hello messages, for example. In certain embodiments, a maintenance end point 112 may include a Maintenance Entity Group End Point (MEP) in accordance with a SOAM standard (e.g., IEEE 802.1ag). In certain embodiments, a maintenance end point 112 may be configured to communicate alarm indication suppression trigger messages to components (e.g., maintenance end points 112 on network interfaces 106 other than the network interface at which the trigger message originates) upstream to the maintenance end point 112. Such trigger messages may be received by one of more AIS generators 116 of a network interface 106 other than the network interface 106 at which such trigger message is originated, as described below. Such trigger messages may be initiated by physical maintenance end points 112 and/or server maintenance end points 112.

As depicted in FIG. 2, a network interface 106 may include an alarm indication suppression (AIS) generator 116. An AIS generator 116 may comprise any system, device, or apparatus configured to receive a trigger message received from a maintenance end point 112 on another network interface 106 downstream of the AIS generator 116, and in response to receipt of such trigger message, generate one or more alarm indication suppression messages (e.g., Eth-AIS messages) to other components (e.g., maintenance end points) upstream of the maintenance end point 112 originating the trigger message. In some embodiments, each egress flow point on a network interface may include an AIS generator 116. In these and other embodiments, an AIS generator 116 may be provisioned to include (e.g., in a database) Eth-AIS information for one or more maintenance end points 112 and/or a list of one or more maintenance end points 112 which may be referenced to carry out functionality of AIS generator 116.

As an illustrative example, a maintenance end point 112 on network interface 106*a* may originate a trigger message and communicate such message to one or more AIS generators 116 upstream of the maintenance end point 112, such as AIS generators 116 on network interfaces 106*c* and 106*d*, for example. Such AIS generators 116 may then communicate alarm indication suppression messages for all flow points that have alarm indication suppression enabled for the particular maintenance end point 112 (e.g., based on a unique identifier of the maintenance end point 112).

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that alarm indication signals may be send to multiple upstream client maintenance end points (e.g., MEPs) where the number of alarm indication signals would otherwise exceed the bandwidth of a maintenance end point originating the alarm suppression messages. For example, a maintenance end point may be limited to a bandwidth that supports sending approximately 4K alarm indication suppression messages, but have 12K upstream client maintenance end points. In traditional approaches, the system would not have sufficient communication bandwidth. However, in the methods and systems of the present disclosure, AIS generators 116 each take on some of the required bandwidth, thus reducing or eliminating the bandwidth limitations. Another advantage may be that service-aware maintenance end-points need not support alarm indication suppression on service transparent maintenance end points.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
communicating a trigger message from a maintenance end point to an alarm indication suppression generator, wherein the maintenance end point is provisioned on a first line card of a network element and the alarm indication suppression generator is provisioned on a second line card of the network element, the trigger message communicated from the first line card to the second line card via a switching element of the network element, the trigger message communicated to the second line card instead of communicating a plurality of alarm indication suppression messages from the maintenance end point to a plurality of flow points associated with the second line card; and
communicating, by the alarm indication suppression generator in response to receiving the trigger message, an alarm indication suppression message to each of the plurality of flow points associated with the second line card that have alarm indication suppression enabled for the maintenance end point.

2. A method according to claim 1, further comprising:
referencing a database configured to store alarm indication suppression information for the maintenance end point; and
transmitting the alarm indication suppression messages based on the contents of the database.

3. A method according to claim 1, wherein the alarm indication suppression messages comprise Eth-AIS messages in accordance with ITU Y.1731.

4. A method according to claim 1, wherein the maintenance end point is a Maintenance Entity Group End Point in accordance with IEEE 802.1ag.

5. A network element comprising:
a first line card having provisioned thereon a maintenance end point, the maintenance end point configured to communicate a trigger message to at least a second line card, the trigger message communicated to the second line card instead of communicating a plurality of alarm indication suppression messages from the maintenance end point to a plurality of flow points associated with the second line card;
a switching element configured to communicate the trigger message from the first line card to the second line card; and
the second line card having provisioned thereon an alarm indication suppression generator, the maintenance end point configured to, in response to receiving the trigger message, communicate an alarm indication suppression message to each of the plurality of flow points associated with the second line card that have alarm indication suppression enabled for the maintenance end point.

6. A network element according to claim 5, the second line card further configured to:
reference a database configured to store alarm indication suppression information for the maintenance end point; and
transmit the alarm indication suppression messages based on the contents of the database.

7. A network element according to claim 5, wherein the alarm indication suppression messages comprise Eth-AIS messages in accordance with ITU Y.1731.

8. A network element according to claim 5, wherein the maintenance end point is a Maintenance Entity Group End Point in accordance with IEEE 802.1ag.

* * * * *